(12) United States Patent
Yamagajo et al.

(10) Patent No.: US 7,205,954 B2
(45) Date of Patent: Apr. 17, 2007

(54) MEANDER LINE ANTENNA

(75) Inventors: Takashi Yamagajo, Kawasaki (JP); Toru Maniwa, Kawasaki (JP); Manabu Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/156,532

(22) Filed: Jun. 21, 2005

(65) Prior Publication Data

US 2006/0170606 A1    Aug. 3, 2006

(30) Foreign Application Priority Data

Feb. 1, 2005    (JP)    ............... 2005-024727

(51) Int. Cl.
*H01Q 1/38* (2006.01)
*H01Q 9/26* (2006.01)

(52) U.S. Cl. ............... 343/803; 343/795; 343/806
(58) Field of Classification Search ............... 343/713, 343/795, 803, 806
See application file for complete search history.

(56) References Cited

U.S. PATENT DOCUMENTS

| | | | |
|---|---|---|---|
| 3,167,775 A | * | 1/1965 | Guertler ............... 343/806 |
| 2002/0003496 A1 | | 1/2002 | Brady et al. |
| 2002/0190903 A1 | | 12/2002 | Watada et al. |

FOREIGN PATENT DOCUMENTS

| | | |
|---|---|---|
| JP | 2001-119224 | 4/2001 |
| JP | 2001-217631 | 8/2001 |
| JP | 2002-330018 | 11/2002 |
| JP | 2003-224415 | 8/2003 |
| JP | 2004-032102 | 1/2004 |

OTHER PUBLICATIONS

M. Takiguchi, et al., "Radiation and Ohmic Resistances in Very Small Meander Line Antennas of Less than 0.1 Wavelength," The Institute of Electronics, Information and Communication Engineers, *IEICE Transaction B*, vol. J87-B, No. 9, Sep. 2004, pp. 1336-1345.
M. Takiguchi, et al., "Input Impedance Increase of a Very Small Meander Line Antenna," IEEE Antennas and Propagation Society International Symposium 2003 Digest. APS. Columbus, Ohio. Jun. 22-27, 2003, New York, New York: IEEE, U.S. vol. 4 of 4, Jun. 22, 2003, pp. 856-859.
Takiguchi et al., "*Improvement of Radiation Efficiencies by Applying Folded Configuration to Very Small Meander Line Antennas*"; Wireless Communication Technology, 2003 IEEE Topical Conference on Wireless Communication Technology, Oct. 15-17, 2003, pp. 342-343.

* cited by examiner

*Primary Examiner*—Michael C. Wimer
(74) *Attorney, Agent, or Firm*—Bingham McCutchen LLP

(57) ABSTRACT

A meander line antenna formed in the shape of meander is disclosed. The meander line antenna includes a bottom half section that is constituted by a folded conductive pattern of a folded dipole antenna, and includes a feeding point for mounting an IC chip at the central part; a top half section that is constituted by a folded conductive pattern of a folded dipole antenna shaped like the bottom half section; and a frequency adjusting section consisting of connecting conductive patterns arranged at an interval corresponding to a desired frequency centering on the feeding point, the connecting conductive patterns connecting the bottom half section and the top half section. The connecting conductive patterns can be cut off, and the folded conductive pattern outside of the cut-off connecting conductive patterns can be removed.

5 Claims, 3 Drawing Sheets

CUT  1  CUT

W=20mm

L2=12mm

1

MEANDER LINE ANTENNA

BACKGROUND OF THE INVENTION

1. Field of the Invention

The present invention relates to a meander line antenna that can be used in different frequency bands, the meander line antenna being constituted by a folded conductive pattern.

2. Description of the Related Art

Various flat antennas are proposed for applying to an IC tag (Integrated Circuit Tag), an RF-ID tag (Radio Frequency Identification Tag), and the like, where a meander line antenna is one of the kinds. Various structures of the meander line antenna are proposed, an example being a folded dipole antenna conductive pattern formed in the shape of a zigzag.

An example of a method of manufacturing the meander line antenna that consists of one or more layers of a conductive pattern is known, wherein a meander-like conductive pattern is formed on or in a dielectric substrate and a magnetic substance substrate, the pattern is cut so that a desired antenna property may be acquired, and calcination is performed on the substrate, (for example, Patent Reference 1). Further, according to another known method, a conductive pattern in the shape of a meander serving as a feed radiation electrode, a conductive pattern in the shape of a meander serving as a non-feed radiation electrode, and a conductive pattern for in-series inductance adjustment are formed on a dielectric substrate, wherein the resonance frequency is adjusted by partially removing the conductive pattern for in-series inductance adjustment (for example, Patent Reference 2).

Further, a meander line antenna, a resonance frequency of which is adjustable, is disclosed, wherein the meander line antenna has shorting conductors at two or more places between countering lines of a part of the meander-like conductive pattern. There, the resonance frequency is lowered by selecting cutting points of the shorting conductors; and the resonance frequency is made higher by short-connecting between points of countering lines, such shorting points being properly chosen (for example, Patent Reference 3). Further, a meander antenna that is sealed by dielectrics except for the feeding point of the antenna is known, wherein the resonance frequency is adjusted by selectively removing two or more short circuit sections (for example, Patent Reference 4).

Further, characteristics measurements and simulations are conducted about a meander line antenna applicable to IC tags, and the like, wherein the length of the meander line antenna is set between 0.025 and 0.1 wavelength at 700 MHz, and parameters are width W, length L, line width d, line pitch s, the number of folding times N, and the like of the target antenna (for example, Non-Patent Reference 1).

[Patent Reference 1] JPA 2001-119224

[Patent Reference 2] JPA 2001-217631

[Patent Reference 3] JPA 2002-330018

[Patent Reference 4] JPA 2004-32102

[Non-Patent Reference 1] "Radiation and Ohmic Resistances in Very Small Meander Line Antennas of Less than 0.1 Wavelength", Masato Takiguchi and Yoshihide Yamada, The Institute of Electronics, Information and Communication Engineers, IEICE Transaction B, Vol. J87-B No. 9, pp 1336–1345, September 2004.

DESCRIPTION OF THE INVENTION

[Problem(s) to be Solved by the Invention]

A meander line antenna is a plane type antenna that can be made, for example, into a size of about 50 mm×20 mm, and can be produced in large quantity using printed-circuit technology applied to manufacturing various kinds of printed circuit boards. However, the property of the antenna is greatly influenced by operating environment conditions, and electrical properties such as a dielectric constant of the substrate serving as a card on which the meander line antenna is installed. For this reason, a problem is that design changes in the antenna length, etc., and trial productions have to be repeated until a desired property adequate for a place of use corresponding to the electrical property of the substrate of the meander line antenna is acquired. Further, at present, a band between 860 and 960 MHz, and another band in the 2.45 GHz range are available for the RF-ID tags. Therefore, in order to obtain a meander line antenna applicable to two or more frequency bands such as described above, the problem of having to repeat the design changes and trial productions for each of the bands is more serious.

SUMMARY OF THE INVENTION

It is a general object of the present invention to provide a meander line antenna that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a meander line antenna particularly pointed out in the specification in such full, clear, concise, and exact terms as to enable a person having ordinary skill in the art to practice the invention.

[Means for Solving the Problem]

To achieve these and other advantages and in accordance with the purpose of the invention, as embodied and broadly described herein, the invention provides as follows.

The present invention provides a meander line antenna structured by folding a conductive pattern of a folded dipole antenna, including a bottom half that consists of a folded conductive pattern having a feeding point at its center, and a top half that is shaped like the bottom half but without a feeding point, wherein the bottom half and the top half are connected by connecting conductive patterns provided at intervals that correspond to desired frequencies, the intervals centering on the feeding point. The connecting conductive patterns serve as a frequency adjusting section.

According to an aspect of the present invention, selected connecting conductive patterns of the frequency adjusting section corresponding to the desired frequency are kept intact, the folded conductive patterns outside of the selected conductive patterns are removed, and the connecting conductive patterns inside of the selected connecting conductive patterns are removed, such that resonance at the desired frequency is obtained.

The meander line antenna according to another aspect of the present invention includes a fine-tuning section that consists of two or more short circuit conductive patterns that connect certain countering conductive patterns of the top half section at positions in predetermined intervals, the certain countering conductive patterns countering the feeding point of the bottom half section.

[Effect of the Invention]

Since resonance to the desired frequency is attained by cutting off connecting conductive patterns, repetition of design changes and trial productions for every frequency band is dispensed with.

DESCRIPTION OF THE PREFERRED EMBODIMENTS

In the following, Embodiments of the present invention are described with reference to the accompanying drawings.

Figure 1A:
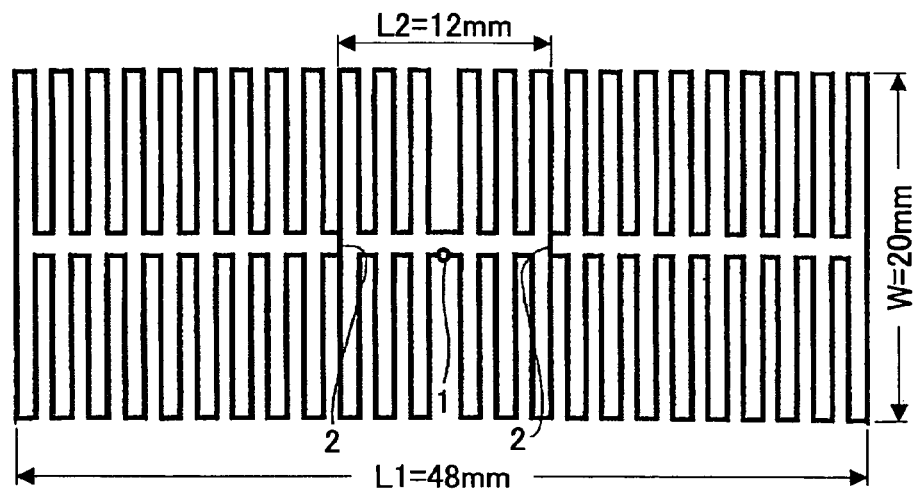
FIG. 1A through FIG. 1E are pattern views according to Embodiment 1 of the present invention.

The meander line antenna of the present invention is constituted by a folding conductive pattern of a folded dipole antenna in the shape of a meander as shown in FIG. 1A, and includes two sections, namely, a bottom half section and a top half section. The bottom half section has a feeding point 1 at its central point. The top half section is shaped like the bottom half section, except that no feeding point is provided. The bottom half section and the top half section are connected by conductive patterns 2 provided at a predetermined interval corresponding to resonance frequencies, the feeding point 1 being at the center of the interval. The conductive patterns 2 serve as a frequency adjusting section.

Below, dimensions in the parenthesis are for example.

Embodiment 1

Embodiment 1 is described with reference to FIGS. 1A through 1E. FIG. 1A shows the basic structure of the folded dipole meander line antenna, wherein a folded conductive pattern (width of which is 0.25 mm) is arranged in an area of a length L1 (48 mm) and a width W (20 mm). This structure is capable of providing one of two resonance frequencies by leaving or cutting the connecting conductive patterns 2 that are apart from each other at a length L2 (12 mm). An IC chip is mounted on the central part of the bottom half section, and connected to the feeding point 1.

Figure 1B:
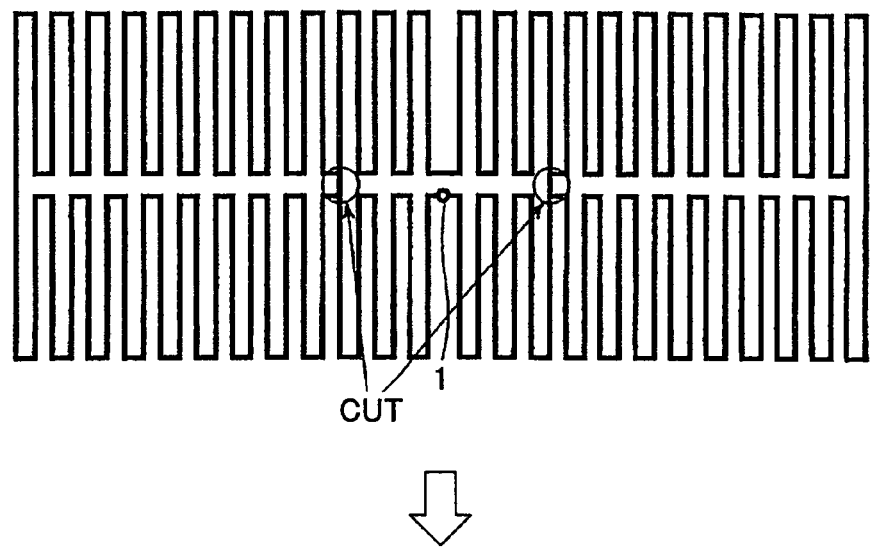
Figure 1C:
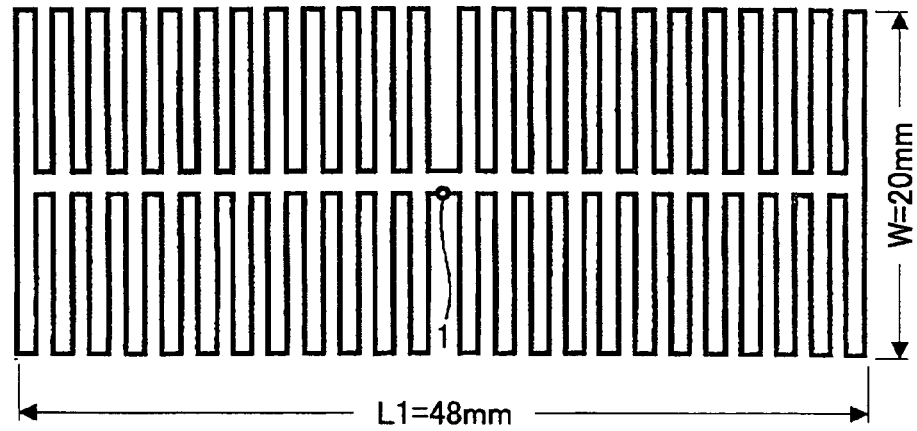

FIG. 1B highlights cutting positions of the connecting conductive patterns 2 that may be cut off according to the desired frequency. FIG. 1C shows a state after cutting off the connecting conductive pattern 2 by a cutter, a punch, and the like, at the cutting positions. That is, the meander line antenna having the length L1 (48 mm) and width W (20 mm) is obtained, which dimensions are appropriate for the 860–960 MHz band.

Figure 1D:
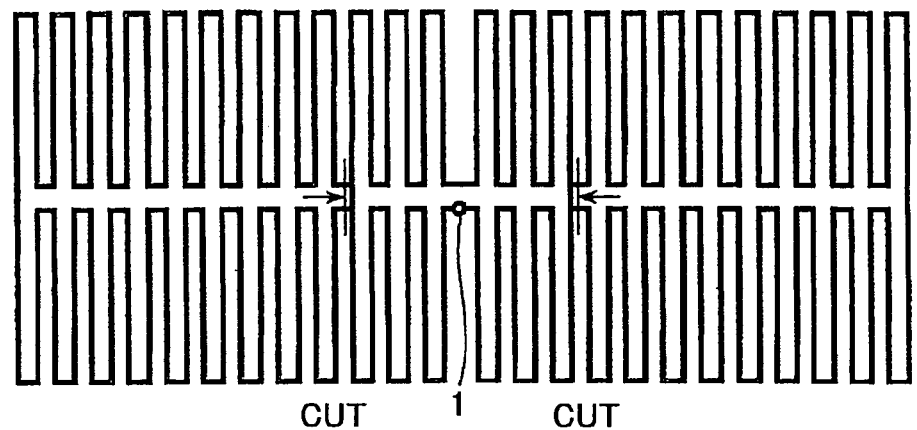
Figure 1E:
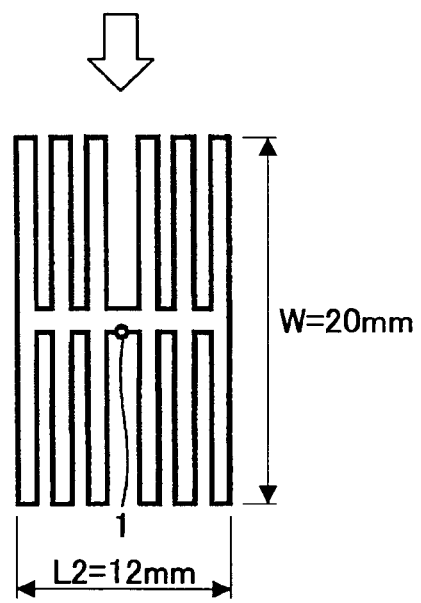

FIG. 1D shows the same conductive pattern of the basic composition as FIG. 1B. FIG. 1D shows cutting lines for removing the conductive patterns outside of the respective positions of the connecting conductive patterns 2 serving as the frequency adjusting section. When the outside conductive patterns are cut along the cutting lines, the meander line antenna having the length L2 (12 mm) and the width W (20 mm) is obtained as shown in FIG. 1E. These dimensions are appropriate for the 2.45 GHz band.

In summary, the basic structure shown in

FIG. 1A can be made for the 860–960 MHz band with the width W (20 mm) and the length L1 (48 mm) by cutting off the connecting conductive patterns 2 as shown in FIG. 1C; or alternatively, can be made for the 2.45 GHz band with the width W (20 mm) and the length L2 (12 mm) by removing the outside conductive patterns, and leaving the connecting conductive patterns 2 as shown in FIG. 1E. That is, the meander line antenna for one of the two frequency bands can be obtained from the basic structure shown in FIG. 1A.

Embodiment 2

Next, Embodiment 2 of the present invention is described with reference to FIG. 2. Dimensions are for example, and are given in parenthesis. The meander line antenna according to Embodiment 2 basically has the width W (20 mm) and the length L1 (48 mm). The top half section and the bottom half section are connected by two or more conductive patterns (conductive pattern width being 0.25 mm) that are arranged at different intervals centering on the feeding point 1, the conductive patterns serving as a frequency adjusting section 3. The intervals are L2 (40 mm), L3 (32 mm), L4 (24 mm), L5 (16 mm) and L6 (8 mm). Further, two or more short circuit conductive patterns, which serve as a fine-tuning section 4, are arranged between countering conductive patterns at the central part of the top half section in a predetermined interval at a position that counters the feeding point 1 of the bottom half section.

The connecting conductive patterns arranged at the intervals L1 through L6 centering on the feeding point 1, serving as the frequency adjusting section 3, are selectively cut off according to a desired frequency band, so that frequencies having relations as F1<F2<F3<F4<F5<F6, with intervals L1 through L6 corresponding to the frequencies F1 through F6, respectively, are selected. As for the fine-tuning section 4, a selected short circuit conductive pattern is left intact, and other short circuit conductive patterns are cut off such that the impedance at the frequency selected by the frequency adjusting section 3 become a desired value.

Figure 2:
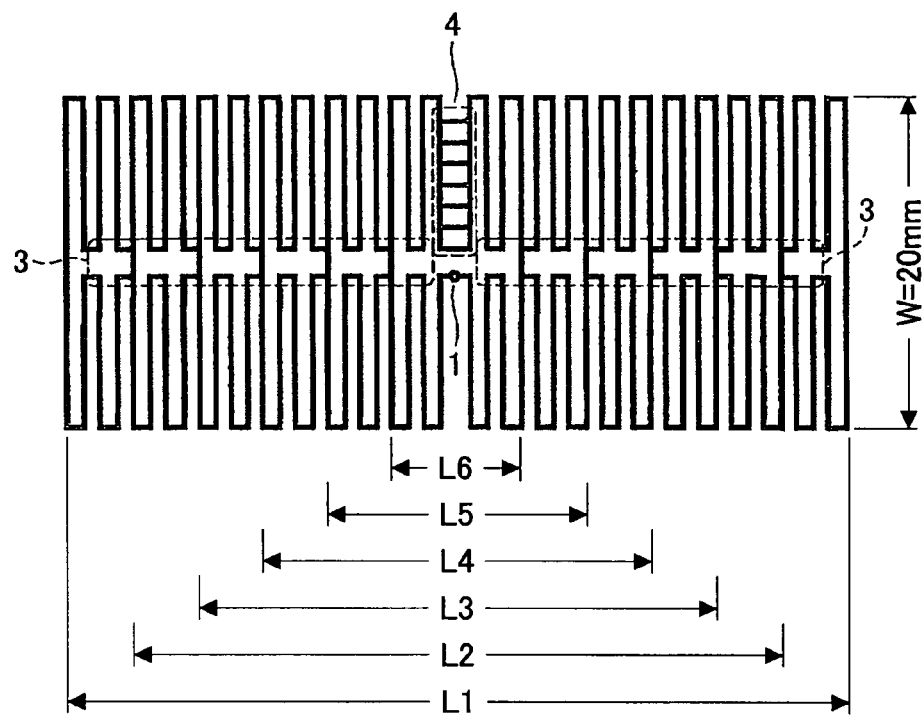
FIG. 2 is a pattern view according to Embodiment 2 of the present invention.
Figure 3:
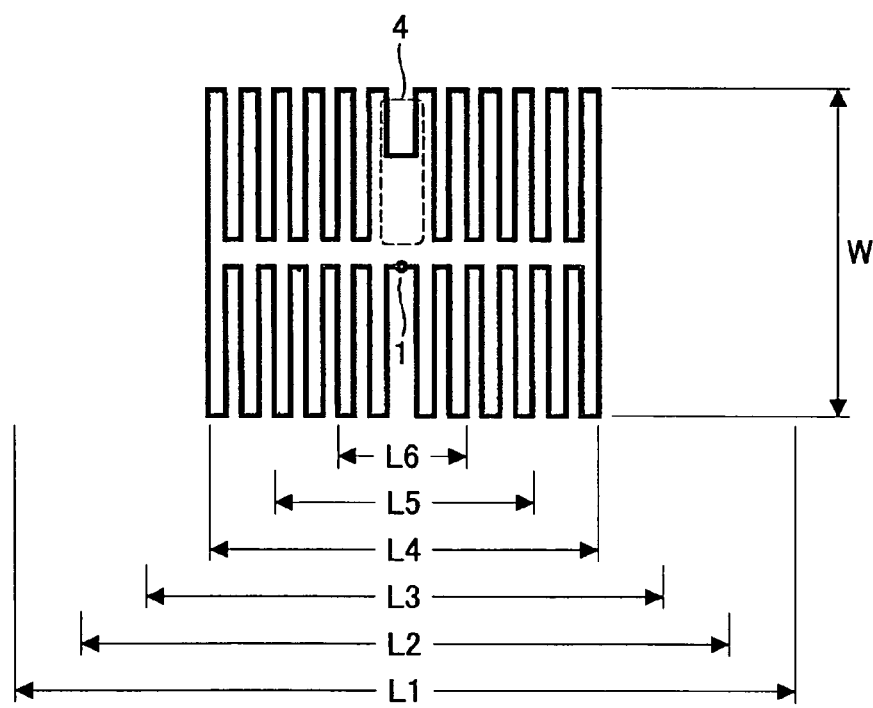
FIG. 3 is a pattern view according to Embodiment 2 of the present invention.

FIG. 3 shows an example of actual practice based on the structure shown in FIG. 2. Specifically, in this example shown in FIG. 3, the connecting conductive patterns of the frequency adjusting section 3 of the interval L4 centering on the feeding point 1 are left intact; the connecting conductive patterns corresponding to the intervals L5 and L6 inside of L4 are cut off; and the folded conductive patterns outside the connecting conductive patterns corresponding to the interval L4 are removed. In this way, the antenna is made for the frequency F4. Here, as for the fine-tuning section 4, only the fifth short circuit conductive pattern, the "fifth" being counted from the feeding point 1 side, is left intact, and others are cut off. The fine-tuning section 4 provides higher impedance when a short circuit conductor that is arranged closer to the feeding point 1 is left intact.

As described above, the antenna having a desired resonance frequency can be obtained by leaving connecting conductive patterns intact while cutting off other connecting conductive patterns by a cutter, a punch, and the like, and removing the conductive patterns outside of the connecting conductive patterns between the top half section and the bottom half section. Further, fine-tuning of the impedance of the antenna is attained by selectively removing the short circuit conductive patterns of the fine-tuning section 4.

Further, the present invention is not limited to these embodiments, but variations and modifications may be made without departing from the scope of the present invention.

The present application is based on Japanese Priority Application No. 2005-024727 filed on Feb. 1, 2005 with the Japanese Patent Office, the entire contents of that are hereby incorporated by reference.

What is claimed is:

1. A meander line antenna formed by folding a conductor pattern of a folded dipole antenna in the shape of a meander, comprising:
   a bottom half section that includes a folded conductor pattern, and a feeding point arranged at approximately a central part of the bottom half section;
   a top half section that includes a folded conductor pattern shaped like the folded conductor pattern of the bottom half section; and
   a frequency adjusting section constituted by connecting conductor patterns and configured to connect the bottom half section and the top half section at intervals corresponding to desired resonance frequencies, the intervals centering on the feeding point,
   wherein connecting conductor patterns of the frequency adjusting section corresponding to a desired frequency remain intact, connecting conductor patterns inside of the intact connecting conductor patterns are removed, and the folded conductor patterns outside of the intact connecting conductor patterns are removed.

2. A meander line antenna formed by folding a conductor pattern of a folded dipole antenna in the shape of a meander, comprising:
   a bottom half section that includes a folded conductor pattern, and a feeding point arranged at approximately a central part of the bottom half section;
   a top half section that includes a folded conductor pattern shaped like the folded conductor pattern of the bottom half section;
   a frequency adjusting section constituted by connecting conductor patterns and configured to connect the bottom half section and the top half section at intervals corresponding to desired resonance frequencies, the intervals centering on the feeding point; and
   a fine-tuning section that includes a plurality of short-circuit conductor patterns that connect certain countering conductor patterns of the top half section at predetermined intervals, the certain countering conductor patterns being located at a position that counters the feeding point formed in the bottom half section.

3. A meander line antenna comprising:
   conductor patterns of a folded dipole antenna, folded in a meander shape, said conductor patterns comprising:
   a first part including a folded conductor pattern and a central region having a feeding point;
   a second part including a folded conductor pattern having the same shape, length and width as the folded conductor pattern of the first part;
   a frequency adjusting part formed by connecting conductor patterns configured to connect the first and second parts at intervals with reference to the feeding point and correspond to selecting frequencies,
   wherein the connecting conductor patterns of the frequency adjusting part corresponding to a selecting frequency remain intact, while connecting conductor patterns arranged on an inner side of the intact connecting conductor patterns and the folded conductor patterns arranged on an outer side of the intact connecting conductor patterns are removed.

4. The meander line antenna as claimed in claim 3, further comprising:
   a fine-tuning part including a plurality of short-circuit conductor patterns configured to connect conductor patterns of the second part, confronting the feeding point, at predetermined intervals.

5. The meander line antenna as claimed in claim 3, wherein selected connecting conductor patterns of the frequency adjusting part are removable depending on a selecting frequency together with the folded conductor patterns arranged on an outer side of the connecting conductor patterns other than the selected connecting conductor patterns.

* * * * *